Figure 1:
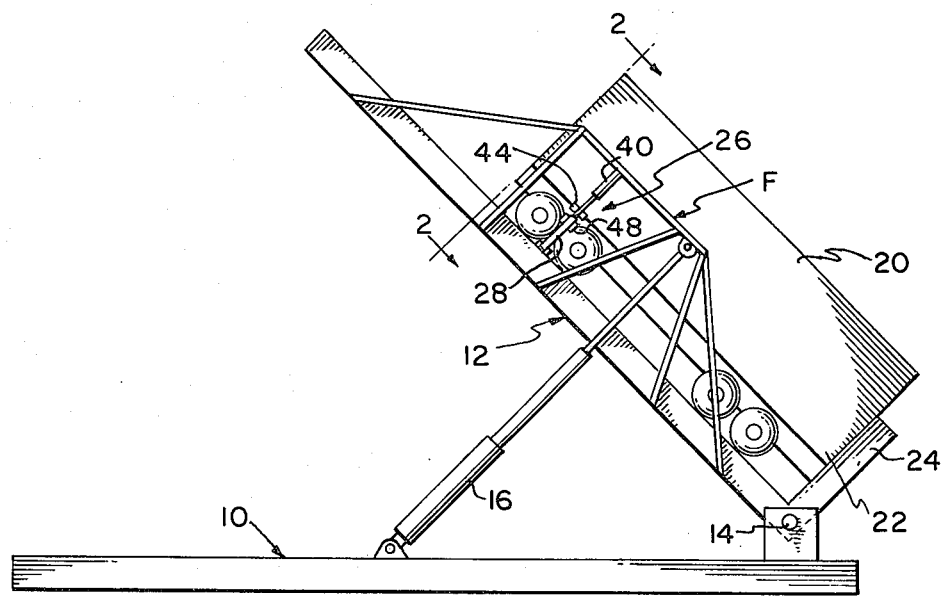

United States Patent [19]
Wetzel

[11] 3,920,135
[45] Nov. 18, 1975

[54] VEHICLE BED VIBRATING APPARATUS

[76] Inventor: Clifford C. Wetzel, Rte. No. 2, Ithaca, Mich. 48847

[22] Filed: Apr. 29, 1974

[21] Appl. No.: 464,756

[52] U.S. Cl. .................................. 214/53; 214/64.2
[51] Int. Cl.² ......................................... B65G 67/40
[58] Field of Search ........ 214/49, 47, 53, 64.2, 308; 222/161; 164/260, 261

[56] References Cited
UNITED STATES PATENTS

| | | | |
|---|---|---|---|
| 3,047,169 | 7/1962 | Matson | 214/64.2 |
| 3,400,770 | 9/1968 | Matson | 214/64.2 X |
| 3,574,332 | 4/1971 | Wetzel | 214/53 |

*Primary Examiner*—Robert G. Sheridan
*Attorney, Agent, or Firm*—Learman & McCulloch

[57] ABSTRACT

A vibrating apparatus for use in facilitating the dumping of a load from a load-carrying vehicle bed supported upon a tilting platform. A bed engaging angle bracket is mounted on the platform for vertical and horizontal movement toward and away from a lower corner surface of the vehicle bed. Differential pressure motors shift the bracket into engagement with the bottom and side of the bed of a vehicle in dumping position upon the platform and a vibrator is operatively coupled to the bracket to vibrate the vehicle bed during the dumping operation. The bracket may be retracted clear of the path of movement of vehicles to and from the dumping position on the platform.

3 Claims, 2 Drawing Figures

U.S. Patent  Nov. 18, 1975  3,920,135

VEHICLE BED VIBRATING APPARATUS

BACKGROUND OF THE INVENTION

In U.S. Pat. No. 3,574,332 there is disclosed a tilting platform for gravitationally dumping bulk-type loads from vehicle trailers or trucks which are not equipped with a dump body. This type of platform is frequently employed in receiving stations where agricultural products are collected. Although the angle of tilt of the apparatus disclosed in such patent is adequate to assure efficient gravitational dumping of the load in most instances, on occasion moisture or the characteristics of the material being dumped will cause the load to bind or stick and in these cases the dumping operation can be substantially assisted by vibration. In the apparatus disclosed in U.S. Pat. No. 3,574,332, a vibrating unit is mounted upon the tilting platform for this purpose.

Experience has shown that a large part of the effectiveness of a platform-mounted vibrator is dissipated, both by the mass of the platform and by the suspension system of the vehicle so that the vibratory action imparted to the vehicle bed to assist in the dumping of sticky loads is but a small part of the total vibrator output. Further, the vibratory action applied directly to the platform can in some instances produce fatigue in structural elements of the platform and increased wear at frictionally engaged surfaces.

In order to achieve the most efficient employment of a vibrator for assisting the gravitational discharge of loads from the vehicle bed, the vibrator should be mounted in a manner such that the vibrating action is applied as directly as possible to the vehicle bed itself. However, in the typical collecting station environment in which the tilting mechanism is employed, individual farmers will deliver produce to the collecting station in a wide variety of load carriers whose variations in dimensions present problems in locating the vibrating unit, in mechanically coupling the vibrating unit into vibration transmitting relationship with the vehicle bed, and in providing the necessary clearance for moving the vehicle to and from its dumping position upon the tilting platform.

The present invention is especially directed to the solution of the foregoing problems.

SUMMARY OF THE INVENTION

A vibrating unit embodying the present invention includes a post mounted at its lower end upon the tilting platform for pivotal movement about an axis such that the upper end of the post is movable toward and away from the bed of a vehicle located in a dumping position on the platform. At the upper end of the post a vibrating transmission arm is pivotally mounted at one end on the post for pivotal movement about an axis parallel to the post pivot, the arm projecting from the upper end of the post toward the vehicle bed. A vibrator unit is mounted at the free end of the arm and a load bed engaging bracket of L-shaped cross section is pivotally mounted also upon the free end of the arm. Two fluid motors are respectively coupled between the tilting frame and the arm and post and are employed to adjust the positions of the arm and post about their respective axes of pivotal movement. The motors may be operated to withdraw the free end of the arm, together with the vibrator and bed-engaging bracket, clear of the path of movement of vehicles to and from the dumping position on the platform and may similarly be operated to shift the bracket into engagement with a lower corner edge of a vehicle bed and to hold the bracket firmly into engagement with the bed while the vibrator is operated to vibrate the bed.

Figure 2:
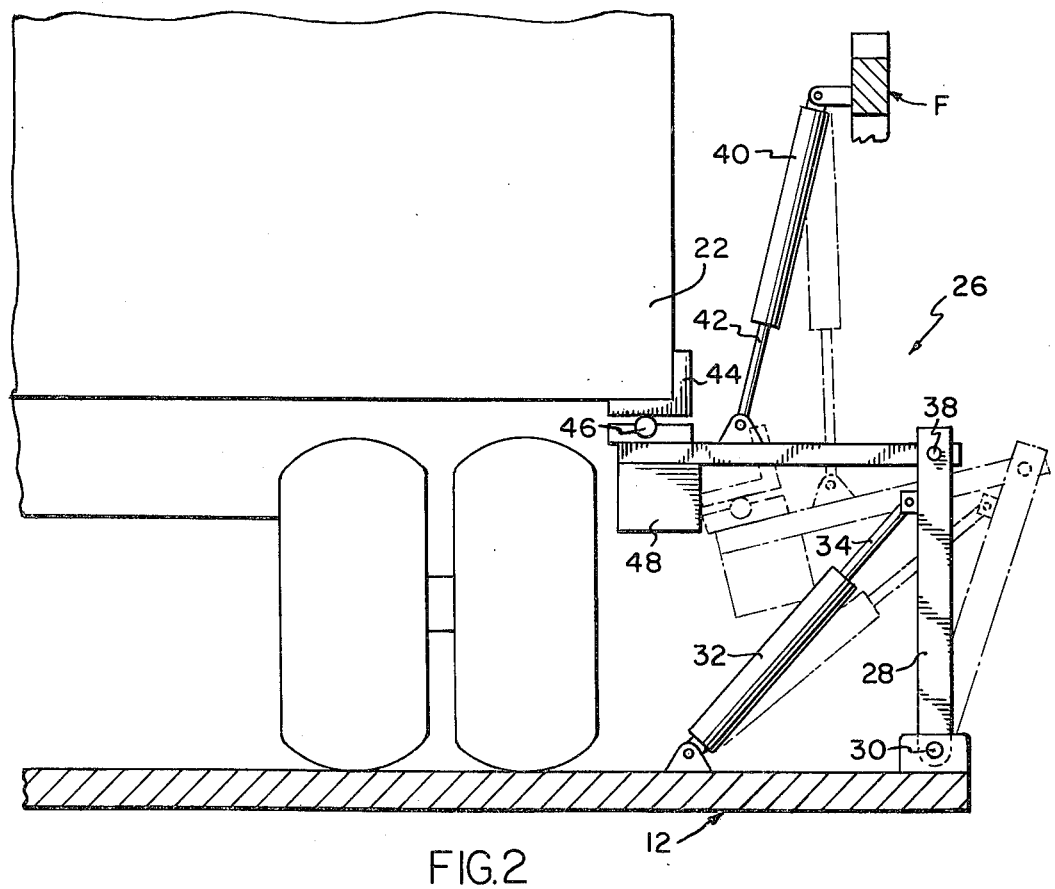

Other objects and features of the invention will become apparent by reference to the following specification and to the drawings, wherein:

FIG. 1 is a side elevational view of a tilting platform employing the present invention; and FIG. 2 is a detailed cross sectional view taken approximately on line 2—2 of FIG. 1 showing the structure of the vibrating apparatus.

In FIG. 1 there is shown in side elevation a vehicle tilting platform which corresponds substantially to that disclosed in U.S. Pat. No. 3,574,332. The apparatus includes a fixed base generally designated 10 upon which a tilting platform generally designated 12 is supported for pivotal movement about a pivot axis 14, the platform 12 being raised to the tilted position shown in FIG. 1 by a pair of hydraulic rams 16 which are also operable to lower the platform 12 to a horizontal rest position upon the base 10. Platform 12 is constructed to receive and support load-carrying vehicles, such as the tractor and trailer 20 shown in FIG. 1, and to tilt the vehicle into the position shown in FIG. 1 so that the contents of the load-carrying bed 22 of the vehicle may be gravitationally dumped onto a conveyor or other material receiving device located generally at the right-hand end of the tilting mechanism as viewed in FIG. 1. Upright end members 24 fixedly secured to platform 12 engage the rear end of the load carrying bed to hold the vehicle in the position illustrated in FIG. 1. Platform 12 is preferably braced as by side frames F.

A vibrating mechanism designated generally 26 embodying the present invention is mounted upon platform 12, the structural arrangement of the vibrating mechanism 26 being best shown in FIG. 2.

The vibrating mechanism 26 includes a post 28 whose lower end is pivotally mounted as at 30 on platform 12, the axis of pivot 30 extending generally parallel to the longitudinal center line of the load-carrying vehicle so that the upper end of post 28 can be swung about pivot 30 toward and away from one side of a vehicle on platform 12. A fluid motor or ram 32 is pivotally coupled between a suitable location on platform 12 and the upper end of post 28 so that retraction or extension of the rod 34 of motor 32 will pivotally adjust post 28 about its pivotal mounting 30.

One end of a vibration transmission arm 36 is pivotally mounted as at 38 on the upper end of post 28, arm 36 projecting generally from the top of post 28 toward a vehicle on platform 12. Pivot 38 is parallel to pivot 30 so that the free or distal end of arm 36 can be moved either to the left or to the right, as viewed in FIG. 2, about the axis of pivot 38. A second fluid motor or ram 40 is pivotally coupled between the side brace F of platform 12 and the arm 36 adjacent the distal end thereof. Extension and retraction of the rod 42 of motor 40 will thus swing the outer end of arm 36 downwardly and upwardly, respectively, as viewed in FIG. 2.

A load bed engaging bracket 44 is mounted upon the free end of arm 36 for pivotal movement relative to arm 36 about a pivot 46. Bracket 44 is of L-shaped configuration and is adapted to be seated against a lower corner edge of a vehicle bed 22 to engage both the under and side surfaces of the bed as shown in FIG. 2. A standard, commercially available vibrator unit 48 is mounted upon the free end of arm 36 in underlying relationship to bracket 44. The various control connections to motors 32, 40 and to vibrator 48 are completely conventional and well-known in the art and thus have not been illustrated.

As indicated by the dotted line position of the various parts in FIG. 2, the arm 36 may be located by extension of their motors 32 and 40, in a first position in which the arm 36 and the bracket 44 are incapable of engaging a vehicle, thereby enabling a vehicle to be driven onto or off the platform without interference from the vibrating apparatus. Upon retraction of the motors 32 and 40, the arm 36 will be moved to a second position in which the bracket 44 is capable of engaging a vehicle on the platform 12.

In normal use, platform 12 is located in its horizontal position upon base 10 to receive a load-carrying vehicle, and motors 32 and 40 are extended to locate the vibrating mechanism in a retracted position shown in dotted lines in FIG. 2 clear of the path of movement of the vehicle onto the platform 12. When the vehicle is located upon the lowered platform with the rear end of its bed 22 against uprights 24 of the platform, motors 32 and 40 may be retracted to pivot the post and arm into the projected position shown in full lines in FIG. 2 in which bracket 44 is firmly seated against both the side and bottom of a corner edge of the vehicle bed.

Preferably, the motors 32 and 40 are capable of projecting the arm 36 to the left a considerable distance beyond the positions shown in full lines. Thus, the engagement of the bracket with the vehicle bed will occur when the arm 36 is in an intermediate position between its fully retracted and fully extended positions. If fluid pressure is continuously applied to both motors 32 and 40 when bracket 44 engages the load-carrying bed, the motors constantly will bias the bracket into firm engagement with the vehicle bed. The motors, therefore, may be considered both drive means and biasing means.

Following engagement of the vehicle bed and the bracket 44, platform 12 is elevated to the position shown in FIG. 1 and the dumping operation is commenced. In the event that binding of the load is anticipated or begins to occur, vibrator 48 is actuated and the vibratory output of vibrator 48 is transmitted via arm 36 and bracket 44 directly to the load-carrying bed 22 to cause the bed to vibrate to loosen the load.

Normally, the assistance of the vibrator is not required during the initial stages of the dumping operation and frequently, where loads of material which does not normally present any binding or sticking problems is being unloaded, the vibrator may not be initially engaged with the bed where the need for its assistance is not anticipated. Therefore, the controls for operating motors 32 and 40 and for actuating vibrator 48 are preferably located at a position where they are readily accessible whether platform 12 is in its raised or lowered position.

As the load is discharged from the vehicle, the vehicle's suspension system will become less stressed with the result that the vehicle bed is raised relatively to the platform 12. The constant biasing force exerted by the motors 32 and 40 on the arm 36, however, enables the latter to follow the movement of the vehicle bed, thereby maintaining the bracket 44 snugly against the bed.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. For use in combination with a tilting platform operable to support the load-carrying bed of a vehicle in a rearwardly inclined dumping position on said platform to gravitationally dump a load from said bed;

a vibrator assembly for vibrating said bed during the load dumping operation comprising a bracket member simultaneously engageable with adjacent lower and side surfaces of the vehicle bed, first power driven means on said platform for raising and lowering said bracket member relative to said platform, second power driven means on said platform operable independently of said first power driven means for shifting said bracket generally horizontally relative to said platform; said first and second power driven means being operable to shift said bracket between a retracted position clear of the path of movement of a vehicle to and from said dumping position and an operative position wherein said bracket is forcibly held in engagement with a lower and adjacent side surface of a vehicle bed; and vibrating means mechanically coupled to said bracket for imparting vibration of said bracket.

2. For use in combination with a tilting platform operable to support the load-carrying bed of a vehicle in a rearwardly inclined dumping position on said platform to gravitationally dump a load from said bed;

a vibrator assembly for vibrating said bed during the load dumping operation comprising a bracket member simultaneously engageable with adjacent lower and side surfaces of the vehicle bed, power driven support means on said platform supporting said bracket for movement between a retracted position clear of the path of movement of a vehicle to and from said dumping position and an operative position wherein said bracket is forcibly held in engagement with a lower and adjacent side surface of a vehicle bed; said support means comprising a post mounted at its lower end for pivotal movement on said platform in which the upper end of said post is movable toward or away from a vehicle bed in a dumping position on said platform, first power means operable to pivotally adjust said post, an arm pivotally mounted at one end on the upper end of said post for vertical movement of the distal end of said arm relative to said platform, and second power means for pivotally adjusting said arm, said bracket and said vibrating means being mounted on said distal end of said arm; and vibrating means mechanically coupled to said bracket for imparting vibration to said bracket.

3. The invention defined in claim 2 wherein said bracket is pivotally mounted on the upper side of said arm and said vibrating means is mounted on the underside of said arm.

* * * * *